United States Patent [19]
Jones et al.

[11] Patent Number: 5,398,597
[45] Date of Patent: Mar. 21, 1995

[54] ELECTRONIC CONTROL SYSTEM FOR COOKING SYSTEM

[75] Inventors: Richard L. Jones, Eaton; Robert W. Stirling, Dayton; Tim A. Landwehr, West Alexandria, all of Ohio

[73] Assignee: Henny Penny Corporation, Faton, Ohio

[21] Appl. No.: 126,198

[22] Filed: Sep. 24, 1993

[51] Int. Cl.$^6$ .............. A47J 27/62; A47J 37/12; G06F 15/20; H05B 1/02
[52] U.S. Cl. .................. 99/330; 99/325; 99/331; 99/333; 99/344; 219/492; 219/506; 364/400; 364/557
[58] Field of Search .............. 99/330–333, 99/325, 326, 337, 338, 334–336, 341–344; 219/448, 492, 483, 486, 494, 501, 506; 364/400, 557, 143–146; 426/233, 438, 523

[56] References Cited

U.S. PATENT DOCUMENTS

| | | | |
|---|---|---|---|
| 4,179,214 | 12/1979 | Pone, Jr. | |
| 4,282,423 | 8/1981 | Volz | 99/330 |
| 4,350,858 | 9/1982 | Yoshida | 219/506 |
| 4,437,159 | 3/1984 | Waugh | |
| 4,633,067 | 12/1986 | Payne et al. | |
| 4,636,949 | 1/1987 | Longabaugh | |
| 4,812,625 | 3/1989 | Ceste, Sr. | 219/492 |
| 4,858,119 | 8/1989 | Waugh et al. | |
| 4,913,038 | 4/1990 | Burkett et al. | |
| 4,914,277 | 4/1990 | Guerin et al. | |
| 4,920,948 | 5/1990 | Koether et al. | 99/330 |
| 5,051,562 | 9/1991 | Bailey et al. | |
| 5,073,861 | 12/1991 | Itoh et al. | 364/557 |
| 5,090,305 | 2/1992 | Lehman | 99/330 |
| 5,097,113 | 3/1992 | Aoyama | |
| 5,111,028 | 5/1992 | Lee | 99/325 |
| 5,126,536 | 6/1992 | Devlin | 99/333 |
| 5,183,984 | 2/1993 | Nakagawa | 99/325 |
| 5,186,097 | 2/1993 | Vaseloff et al. | 364/400 |
| 5,240,725 | 8/1993 | Akamatsu et al. | 426/233 |

Primary Examiner—Timothy F. Simone
Attorney, Agent, or Firm—Baker & Botts

[57] ABSTRACT

The present invention is directed to a computerized control system for use with a cooking system, such as a deep fat fryer. The control system has a plurality of separately accessible control levels. The control system has a control pad comprising a plurality of function switches. Each of the control levels may be accessed by simultaneously depressing a particular combination of function switches. Cooking parameters can be entered at each level, so that unique cooking parameters for various types of food products can be individually programmed into the control system or so that a single set of cooking parameters for use with all food products can be programmed into the control system. During a cooking cycle, the status of the cycle for a particular product and the usage of that product may be displayed on a control pad.

27 Claims, 7 Drawing Sheets

ELECTRONIC CONTROL SYSTEM FOR COOKING SYSTEM

REFERENCE TO MICROFICHE APPENDIX

Object code for two embodiments of the control system of the present invention is contained with this application in 2 microfiche, microfiche appendices 1 and 2, each containing 37 frames.

BACKGROUND OF THE INVENTION

1. Field of the Invention

This invention relates to control systems and, in particular, to programmable control systems with means for limiting access to a plurality of control levels for controlling a cooking system. Moreover, an embodiment of the invention is directed to a programmable control system capable of controlling a three-well open fryer. A further embodiment of the invention includes three levels of access to the control system: an operator's control level, a manager's control level, and a supervisor's or diagnostic technician's control level.

2. Description of the Related Art

It is known that cooking systems, such as deep fat fryers, may be equipped with means for restricting access to programmable controls. These control systems provide a variety of access means, such as numerical access codes, see, e.g., U.S. Pat. No. 4,636,949 to Limgabaugh and U.S. Pat. No. 4,431,159 to Waugh; access keys, see, e.g., U.S. Pat. No. 4,913,038 to Burkett et al.; and the sequential operation of data entry switches, see, e.g., U.S. Pat. No. 4,858,119 to Waugh et al. Each of these references, however, appears only to disclose means for limiting access to a single level of the control program. Other related systems have also attempted to ensure the reliable operation of the control system by providing activation means which only engage the cooking system or start a cooking cycle when the activation means, e.g., the switch, have been depressed for a predetermined period, such as those disclosed in U.S. Pat. No. 5,097,113 to Aoyama and U.S. Pat. No. 5,051,562 to Bailey.

Cooking systems often have a temperature probe, a heating element, a temperature selector for enabling a user to select a desired cooking temperature, and control means for controlling the heating element(s) to be operated in different modes corresponding to the different stages of operation of the cooking system. For example, a deep fat fryer may be provided with a melt mode wherein solid shortening or liquid shortening below a predetermined temperature is heated at a slow rate, typically by pulsing the heating element, until the solid shortening melts or the liquid shortening reaches a predetermined temperature.

Numerous parameters may be input to a control system to control the cooking cycle of a food product or products. Some of these parameters are disclosed in U.S. Pat. No. 4,913,038 to Burkett et al., the disclosure of which is incorporated herein by reference. A single set of parameters may be input to control all cooking cycles performed by the cooking system, or unique sets of parameters may be input for each food product. Some of these parameters are described below.

Typically, after the shortening melts or reaches the predetermined temperature, the heating element will be operated in a second mode wherein the temperature of the shortening is rapidly increased to a selected temperature at which cooking is to occur. While a rapid increase in temperature to the selected temperature is desirable to minimize recovery time, if the temperature is raised too rapidly or turned off precisely at the selected temperature, or both, the internal heat capacity stored in the system may cause the temperature to exceed the selected temperature. This undesirable phenomenon is known as overshoot.

In order to prevent overshoot, some related art systems establish a temperature range, extending a predetermined number of degrees below the selected temperature, and operate the heating element in a full-on mode up to this temperature range and then operate the heating element in a reduced power or pulsed mode once the temperature is within the established temperature range. The rate of temperature increase is thereby more precisely regulated, and overshoot of the selected temperature is minimized. The effectiveness of providing such a temperature range is dependent in part upon the temperature at which this reduced power or pulsed mode initiates. A tradeoff occurs between how rapidly the selected temperature can be reached and how effectively overshoot is minimized.

One significant drawback with such an operating scheme is that the temperature range often is fixed and can not be altered by users for different food products. Under certain operating conditions, a user may desire a faster heating time and may be willing to tolerate some chance of overshoot. At other times, it may be desirable to forego the pulsed mode entirely and effectively provide thermostatic (on/off) control by setting the temperature range to zero. In yet other circumstances, the heating time is less important than assuring that overshoot is minimized, and a wider temperature range is preferable.

It, therefore, would be desirable to provide a control system capable of being operated in a full-on mode up to a first temperature and capable of being selectively operable in a pulsed mode thereafter to bring the temperature up to the selected temperature. A proportional control parameter determines the number of degrees, e.g., between 0 and 99, below the set temperature at which the pulsed mode will be initiated to avoid overshoot. This first temperature may be user selectable to provide more flexibility and enable a variety of user conditions to be taken into account to maximize food product cooking quality and consistency. For example, by selecting a first temperature near the set temperature, faster heating time can be obtained—that is the set temperature can be reached in a shorter period of time because the heating element remains in a full-on mode for a longer period of time. Conversely, in order to minimize the chance of overshooting the set temperature, the first temperature can be selected by the user to be substantially lower than the set temperature. Greater regulation of the shortening temperature can be obtained because the full-on mode of the heating element is terminated well below the set temperature. It would also be desirable to be able to effectively override the pulsed mode by providing a thermostatic (on/off) control, so that no pulsed mode occurs, thereby providing faster recovery time, but accepting maximum potential for overshoot. The present invention allows a proportional control parameter to be input for each of a plurality of food products or for a single parameter to be preprogrammed for all food products cooked in the cooking system.

In some related art systems that employ a pulsed mode as described above, the pulsed mode may be entered directly and immediately after the full-on mode. This, however, may also be a drawback because depending on operating conditions and system parameters, the pulsed mode might not be needed or desired. For example, if the temperature of the shortening is sufficiently close to the set temperature when the full-on mode is terminated, then the internal heat capacity of the cooking system may be capable of raising the shortening's temperature to the set temperature. This results from the temperature rise due to the stored internal heat capacity of the system after the heating element is turned off. This thermal lag time can cause the temperature of the shortening to drift up to the set temperature without the further application of heat, such as by pulsing the heating element. Other systems do not provide any pulsed mode, but rather calculate a temperature at which the heating element may be turned off, such that when the heating element is turned off, the internal heat of the system will cause the cooking medium to drift up to the set temperature. Precise control of the temperature of the cooking medium, however, is difficult to maintain in these systems.

It, therefore, would be desirable to cause a system to enter a wait or hold mode between the termination of a full-on mode and the initiation of the pulsed mode until a predetermined condition is met before any further control of the heating element is performed. This predetermined condition may be that the temperature rate of change is less than or equal to a predetermined value, such as the rate of change of temperature of the shortening within the fryer is less than or equal to a predetermined value, for example, zero. Once this predetermined condition is met, the wait or hold mode is exited and depending on the relationship between the temperature of the shortening and the set temperature when this mode is exited, the next mode of operation will be initiated. For example, if the temperature of the shortening is a predetermined number of degrees less than the set temperature when the predetermined condition is met, additional heat may be provided by again placing the heating element in a full-on mode.

Another important consideration when using a deep fat fryer for cooking is the proper maintenance of the cooking medium. Specifically, if shortening is used, it is necessary to filter the shortening periodically to maintain cooking quality due to the absorption of oils and odor from the cooked food products, and degradation of the shortening caused by breakdown thereof due to heat, extended use, and other factors. The number of times a type of food product may be cooked in the same shortening before filtering is required, i.e., the number of filter cycles or the filter cycle parameter, varies from one food product to another. For example, cooking french fries may not require the shortening to be filtered as often as is required with other products, such as breaded fish. In particular, it has been found that cooking breaded fish in a deep fat fryer requires the shortening to be filtered more frequently due to various factors, including the oil released by the fish during frying and the type of breading used. Other products, such as chicken, generally have filter cycles parameters somewhere between those of french fries and breaded fish.

Some related art systems provide an indication that it is time to filter the shortening based on a count of the number of cook cycles completed, regardless of the type of food product being cooked. This may lead to filtration that is either too frequent or too infrequent based on the types of food products cooked. It would, therefore, be desirable to provide an efficient and simple way to keep track of the number of times that different types of food products have been cooked and to provide an indication to the user when it is time to filter the cooking medium and thereby avoid under or over filtration of the cooking medium and further maintain the quality of the cooked product. The present invention allows the selection of a filter cycle parameter for each product or a single parameter for all products cooking in a single fryer.

Another concern related to deep fat fryer cooking operations is how to deal with the situation that arises when a temporary power outage condition causes an interruption of a cooking cycle. One answer would be to simply dispose of any food product that was being cooked when a power outage occurred. Obviously, this is not a desirable alternative because it wastes food products, which is neither socially nor economically desirable. It, therefore, would be desirable to allow a cooking cycle that was interrupted due to a temporary power outage condition to continue if the quality of the food product can be maintained. Further, this determination is important if the system is to keep track of the number of cooking cycles completed for each product.

In the present invention, the remaining cooking time and the temperature of the shortening at the time of power outage may be stored in a nonvolatile random access memory (NOVRAM). If the temperature of the shortening is a predetermined number of degrees below the set temperature when power is restored, the cook cycle may be aborted. If, however, the temperature of the shortening is less than a predetermined number of degrees below the set temperature when power is restored and a non-zero time is displayed for the remaining cooking time, the food cooking operation may continue from the point in the cook cycle at which the power outage occurred. It is advantageous to make a determination whether to abort or continue to cook based on how much the temperature has dropped. If the temperature has dropped too much, the food product may absorb too much shortening or it may take too long for the cooking medium to return to the set temperature whereby at the end of the cooking time the food product(s) may be of poor quality or not fully cooked. Alternatively, the determination may be based on the percentage of the cooking cycle completed when power is lost. The amount of time that elapses during the temporary power outage condition, however, may not be a reliable factor on which to base such a determination because the rate at which the temperature may drop may vary.

Typically, the introduction of a food product or products into a cooking medium causes the temperature of the cooking medium to drop. This phenomenon is sometimes referred to as "thermal shock." Usually, this temperature drop is not detected by the system immediately, so that there is a time delay between the temperature drop due to thermal shock and the system's recognition of and response to the need for additional heat. Some related art systems overcome this temperature drop by turning on a heating element or elements before the need for heat is realized by the system, thereby "anticipating" the need for heat. It would, however, be desirable to allow a user the flexibility of selecting whether or not to use such a load anticipation feature with each type of food product by programming a load anticipation parameter, e.g., an estimated temperature increase to offset the expected temperature drop due to the addition of a predetermined quantity of a food product, into each food product cooking cycle. Moreover, it would be a desirable safety feature to limit the temperature which the shortening can reach while using the load anticipation feature.

Some related art systems also cause the heating element to be controlled in an idle mode when a certain period of inactivity exists. This mode causes the cooking medium to be maintained at a temperature significantly below the set temperature to avoid unnecessary breakdown of the cooking medium while assuring that a cooking medium, such as shortening, remains in a liquid state and at a temperature that will enable satisfactory recovery time if the medium needs to be reheated to the set temperature for cooking. Nevertheless, it would be desirable to provide a user with the option of selecting when and how the idle mode should be entered. Typically, an idle mode may be activated automatically or manually. In the automatic setting, the idle mode might be activated if no cooking cycle was begun for a predetermined period of time. A single idle temperature may be set for all food products.

In view of the large number and variety of parameters involved in the cooking cycle for any food product, the variety of food products, and effect that any change in parameters may have on the quality of the cooked food products, it would be desirable to limit access to the control system program at various levels. This would permit various decision makers to alter the control system program, but each within only a circumscribed range of options. For example, this allows an operator to use the system within the scope of his or her authority, but also allows a manager to maintain hierarchical control of the system, facility, or plant. Thus, it might be desirable to allow different degrees of access to a cooking system operator, a restaurant manager, and a supervisor or diagnostic technician to ensure the reliable and efficient operation of the cooking system.

It would further be desirable to enable a computer controlled cooking system to store usage information, so that a user may be provided with an indication of the number of times a particular cycle has been completed and the total number of times that all of the cycles have been completed.

SUMMARY OF THE INVENTION

In order attain the advantages and desirable features mentioned above and to overcome deficiencies and drawbacks in the related art, it is an object of the present invention to provide a computer controlled cooking system that provides maximum flexibility to system users, such as operators, managers, and supervisors or diagnostic technicians; accommodates a broad range of cooking needs and operating conditions; and permits the tailoring of cooking parameters for a variety of food products. It is a further object of the invention to provide a programmable control system possessing a plurality of control levels. It is desirable that such a cooking system permit only limited access to each control level and that information concerning the progress and status of a cooking cycle be readily available to system users. By limiting access, inadvertent and incorrect changes to food product cooking parameters can be reduced or eliminated.

It is another object of the invention that it is equipped with access limiting means to prevent access to the control levels by unauthorized persons. It is a feature of the invention that these control levels may only be accessed by simultaneously depressing a predetermined combination of switches. It is an advantage of this invention that by using existing switches, no additional elements need be added to a control system's control pad, and the location of the access switches are not easily identified on the pad.

It is yet another an object of this invention to provide adjustment pulses to a heating element and to maintain the temperature of the cooking medium, such as shortening, at a set temperature in an economical and efficient manner by varying the on and off times of a heating element. It is a further object of this invention to operate a heat control in a wait or hold mode between the termination of a full-on mode and the commencement of a pulsed mode until a predetermined condition is met before further control of the heating element occurs. Specifically, it is an object of the invention to provide a user selectable proportional control parameter for controlling a heating element in a deep fat fryer, whereby the proportional control feature varies a temperature at which a full-on mode is terminated while raising the temperature of the cooking medium to a set temperature.

It is a further object of this invention to provide a filter cycle counter to indicate when shortening in a deep fat fryer should be filtered based on the types of food products that have been cooked. It is a feature of this control system that the number of cooking cycles between cooking medium filterings can be input for each food product. It is also an object of this invention that various other cooking parameters only can be entered at appropriate control levels to the cooking system. These cooking parameters include the duration of and time settings for alarms, a load anticipation parameter with a selectable safety limit, and an idle mode entry protocol.

The present invention comprises a control system for controlling at least one heating element of a cooking system, such as a deep fat fryer, for heating a cooking medium, such as shortening in a fryer, but which may be any medium for transferring heat to the food products. The heating element may be heated by electricity, steam, or the combustion of gas or petroleum fuels, and the like. The cooking system further comprises a cooking vessel for holding the cooking medium and for receiving a plurality of food products, at least one heating element, and a temperature sensor for detecting the cooking medium temperature. The control system further comprises a processor, such as a microprocessor, for receiving, storing, and selectively retrieving cooking parameters at a plurality of separately accessible control levels; for comparing said parameters to inputs from measuring devices; and for transmitting control signals to the cooking system. The measuring devices may include temperature sensors and clocks or other timing devices. It also comprises a control pad having a plurality of function switches for controlling access to each of the control levels and for entering and altering the parameters at each of the control levels. When a predetermined function switch is depressed for greater than a predetermined period, the control system exits the control level; when the predetermined function switch is depressed for less than that predetermined period, however, cooking system information is retrieved from the processor and displayed on the control pad. The cooking system also comprises means responsive to the control pad and the processor for generating the cooking system information for display on the control pad and for controlling the at least one heating element.

Additionally, each of the control levels can be separately accessed by depressing a predetermined combination of the control pad's function switches. The processor may include at least three separately accessible control levels: a first or operator's control level, a second or manager's control level, and a third or supervisor's or diagnostic technician's control level. The control system also may comprise a global product selector accessible at the third control level, such that when the global product selector is engaged, a single set of cooking parameters is input at the first control level for all the food products, and such that when the global product selector is disengaged, a unique set of cooking parameters is input for each of the plurality of food products.

In addition, the function switches may include a first function switch, a second function switch, and a third function switch. The control system may be configured such that the first control level may be accessed by simultaneously depressing the first and second function switches, the second control level may be accessed by simultaneously depressing the second and third function switches, and the third control level may be accessed by simultaneously depressing the third and first function switches. Moreover, the control system may be configured, so that the next higher control level may only be accessed from the previous control level. This allows access to any control level above the first to be further limited. Alternatively, all or some control levels may be accessed from any control level or from a run or cook mode.

The cooking system also may include a programmable alarm for indicating a plurality of timed alarms. The duration and the timing of these alarms may be varied. In one embodiment, the cooking parameters programmable at the first control level may comprise cooking time, holding time, cooking or set temperature, and a plurality of timed alarms. Perhaps, the most significant difference between the single set of parameters entered when the global product selector is engaged and each unique set of parameters is that each unique set must begin with the identification of a particular food product.

Another feature of the present invention permits a user to preprogram a plurality of food products and parameters and thereafter initiate a cooking process by merely selecting the desired product. The program information may include type of food product, cooking time, cooking or set temperature, and various alarms. For example, to program a cooking cycle, a user may preprogram a set temperature, e.g., about 335° F. (158° C.), for a selected food product and cooking time during which one or more alarms may be programmed.

At the second control level, the control system may comprise means for inputting or reviewing the cooking parameters of a particular food product and enabling an idle mode. When the food product's cooking parameters are selected, a load compensation parameter, a proportional control parameter, a cooking medium filter cycle parameter, and a load anticipation parameter may be input for that product. Alternatively, the idle option may be selected to enable the idle mode. When the idle mode is enabled, however, an idle temperature may be input. A single idle temperature may be input for all food products, and the idle mode may be programmed to activate automatically under a given set of circumstances.

Yet another feature of the present invention allows the user to enable and select the idle mode to maintain the temperature of the shortening at a reduced temperature to minimize degradation of the shortening while maintaining it in a liquid state and at a temperature that enables the set temperature to be reached in a reasonable amount of time. As mentioned above, the idle mode may be accessed in a plurality of ways. First, the idle mode may be entered manually by enabling the idle mode at the second control level and then selecting the idle mode from the run or cook mode. Additionally, there may be at least two ways of automatically entering the idle mode. In a first automatic idle mode, the system may be programmed, such that if a predetermined period of time elapses since the last cooking cycle terminated, the idle mode will be entered. A second automatic idle mode may be entered when a predetermined amount of time has elapsed since the last product was selected. These at least two automatic idle modes in combination with manual selection of the idle mode provide user flexibility, but retain a desirable degree of access control. Thus, an appropriate user may enable the automatic modes and program the amount of time to cause automatic entry into the idle mode.

At the third or supervisor's or diagnostic technician's control level, diagnostic means may comprise a temperature unit selector and a temperature sensor or probe calibration means. The temperature unit selector allows the user to select a unit of measure, such as degrees Fahrenheit or Celsius, for entering, measuring, and displaying cooking medium and other temperatures. The temperature sensor calibration means may be used to determine the variance between the cooking medium's set and measured temperatures. Additionally, the diagnostic means may comprise means for varying alarm duration, means for varying holding time duration, means for initializing the cooking system, and means for performing internal tests of the control pad and its input and output functions. Alternatively, the means for system initialization, the system input/output test, and other diagnostic tests may be accessed through a special program mode.

The control system also may be used with a cooking system which comprises a cooking vessel for holding a cooking medium and for receiving a plurality of food products, one or more heating element(s) for heating the cooking medium, temperature sensor means for sensing the temperature of the cooking medium, and a control system. The control system may further comprise a microprocessor for receiving, storing, and selectively retrieving cooking system control parameters, including those parameters described above, at a plurality of separately accessible control levels and for comparing at least the cooking or set temperature and the temperature of the cooking medium. In addition, it may also comprise a control pad for entering the parameters, which comprises a plurality of function switches and means for displaying a list of food products for which control parameters may be entered. Moreover, each of the control levels can be separately accessed by depressing a predetermined pair of function switches. The control system may also comprise means responsive to the control pad and to the microprocessor for generating alarms and displaying cooking system information on the control pad and for controlling the at least one heating element.

Still another feature of the present invention allows authorized personnel to access the computerized control system to obtain a usage summary. This usage summary may provide an indication of the total number of times a type of food product was cooked. Additionally, it may provide a cumulative count which corresponds to the total number of times all food products were cooked. Another advantageous aspect of this feature is that an operator may clear a product count without clearing the cumulative count. This enables individual product counts to be cleared at the end of one time period while the cumulative count of all food products cooked over a longer time period may continue to be stored.

Other objects, advantages, and features will be apparent when the detailed description of particular embodiments of the invention, the drawings, the flowcharts, and circuit diagrams are considered.

DESCRIPTION OF PREFERRED EMBODIMENTS

Figure 1:
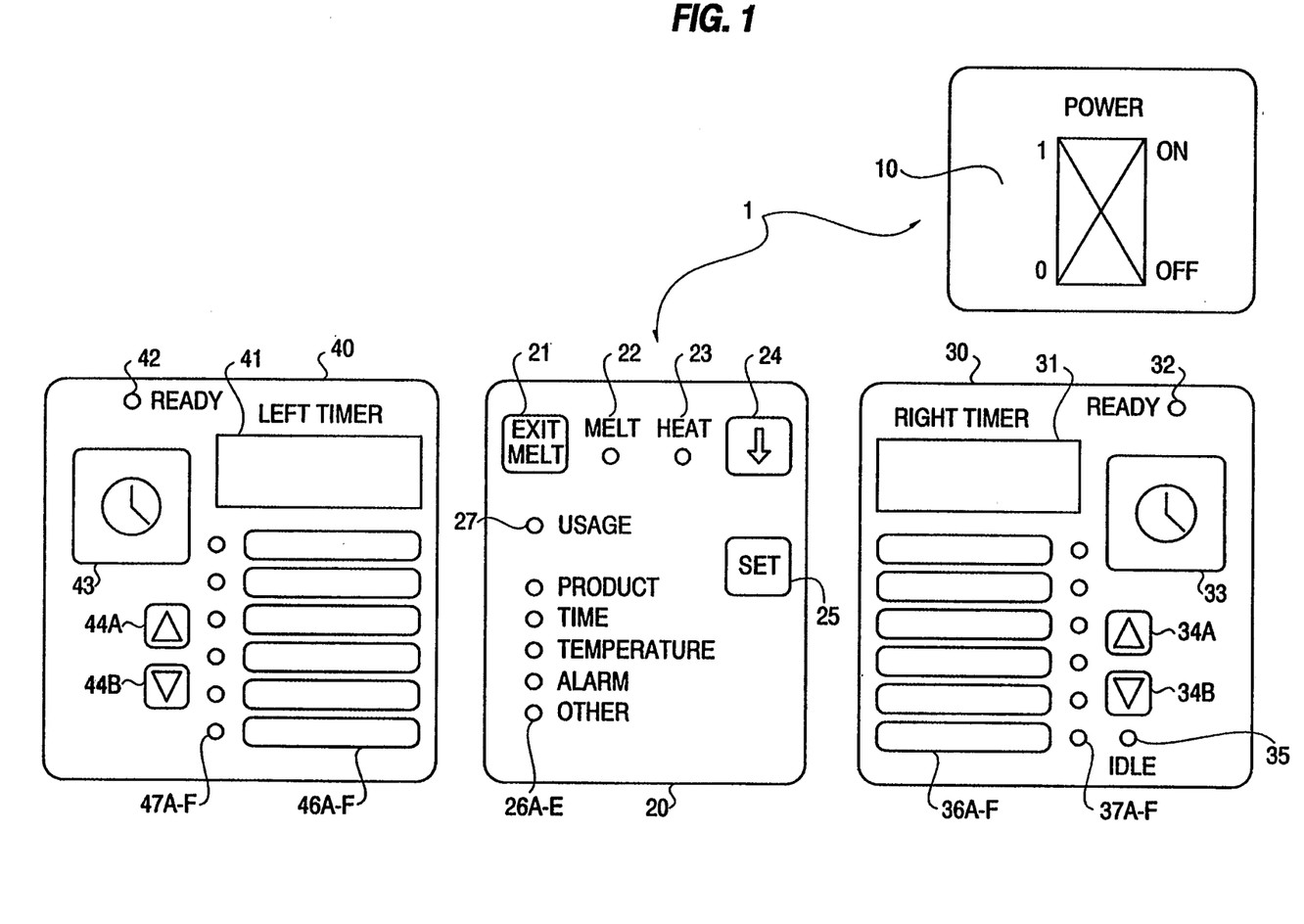
FIG. 1 is a detailed view of a control pad for use in an embodiment of the present invention.

Referring to FIG. 1, a control pad 1 may comprise an on-off power switch 10 and an input panel 20 flanked by a right and a left program display 30 and 40, respectively. When switch 10 is placed in the "on" position, power is available to pad 1 and to the connections and devices necessary to control the heating element(s). Up to six (6) food products can be identified as right product menu items 36A–F. The names of the products may be displayed on pad 1 by means of a menu card listing the products, which may be inserted into the pad's face. Products are selected from amongst items 36A–F with right product selector switches 34A and 34B. These switches allow an operator to scroll up and down through the list of products or to increase or decrease program settings, such as time or temperature, for a selected product. Right program display 30 includes an idle mode indicator 35, and the idle mode can be enabled at the second control level using right product selector switches 34A–B. Further, from the run or cook mode, the idle mode may be manually selected using the right product selector switches 34A–B. Nevertheless, the idle mode can not be manually entered by using left product selector switches 44A and 44B, and no idle mode indicator appears on left program display 40.

Once a product has been selected the shortening will begin to heat to a predetermined temperature. As mentioned above, this temperature may be set for each product or it may be the same for all products, i.e., global. While the shortening is melting, a melt mode indicator 22 will flash. In addition, whenever heat is being supplied by the heating element, a heating element indicator 23 will illuminate. The temperature of the shortening will be displayed when a temperature input switch 24 is depressed. The actual temperature of the shortening may be displayed on left program display 40, and the set shortening temperature on right program display 30. When the shortening has melted and its temperature is in the cooking range for a selected food product, a right or left shortening temperature indicator or "ready" light 32 or 42, will illuminate. The shortening then may be maintained in the molten state by placing the system in the idle mode or by supplying periodic pulses of heat to the shortening. Nevertheless, the melt cycle can be bypassed by depressing an exit melt mode switch 21 for a predetermined period, e.g., about five (5) seconds.

Once a product has been selected from either right or left product menu items 36A–F or 46A–F, the control system can be programmed to the operate the cooking system within parameters tailored for that product. When in the first or second control level, the operator can scroll through the parameters set into the program mode to review parameters or scroll through the parameter settings to input parameters by repeatedly depressing a set switch 25. A set of program mode parameter indicators 26A–E, which may include indicators for "product," "time," "temperature," "alarm," and "other," allows the operator at the first control level to select a product and input parameters including (1) cook time, (2) hold time, (3) cook temperature, and (4) multiple alarm times. At a second control level, a manager may input parameters including (1) hold and alarm duration, (2) load compensation parameter, (3) proportional control parameter, (4) load anticipation parameter, and (5) filter cycle parameter, and if the idle mode is enabled, (6) auto-idle time and (7) idle temperature. The control system also may permit other parameters to be entered. After program parameters have been input, the operator may depress and hold set switch 25 for a predetermined period, e.g., about one (1) second, to exit the program mode. Moreover, if no switches are depressed for a predetermined period, e.g., about sixty (60) seconds, the control system will return to the run or cook mode.

By depressing and holding set switch 25 while in the run or cook mode, the number of completed cooking cycles, i.e., usage, of the selected food product is displayed. While usage is being reviewed, a usage indicator 27 flashes.

Figure 2:
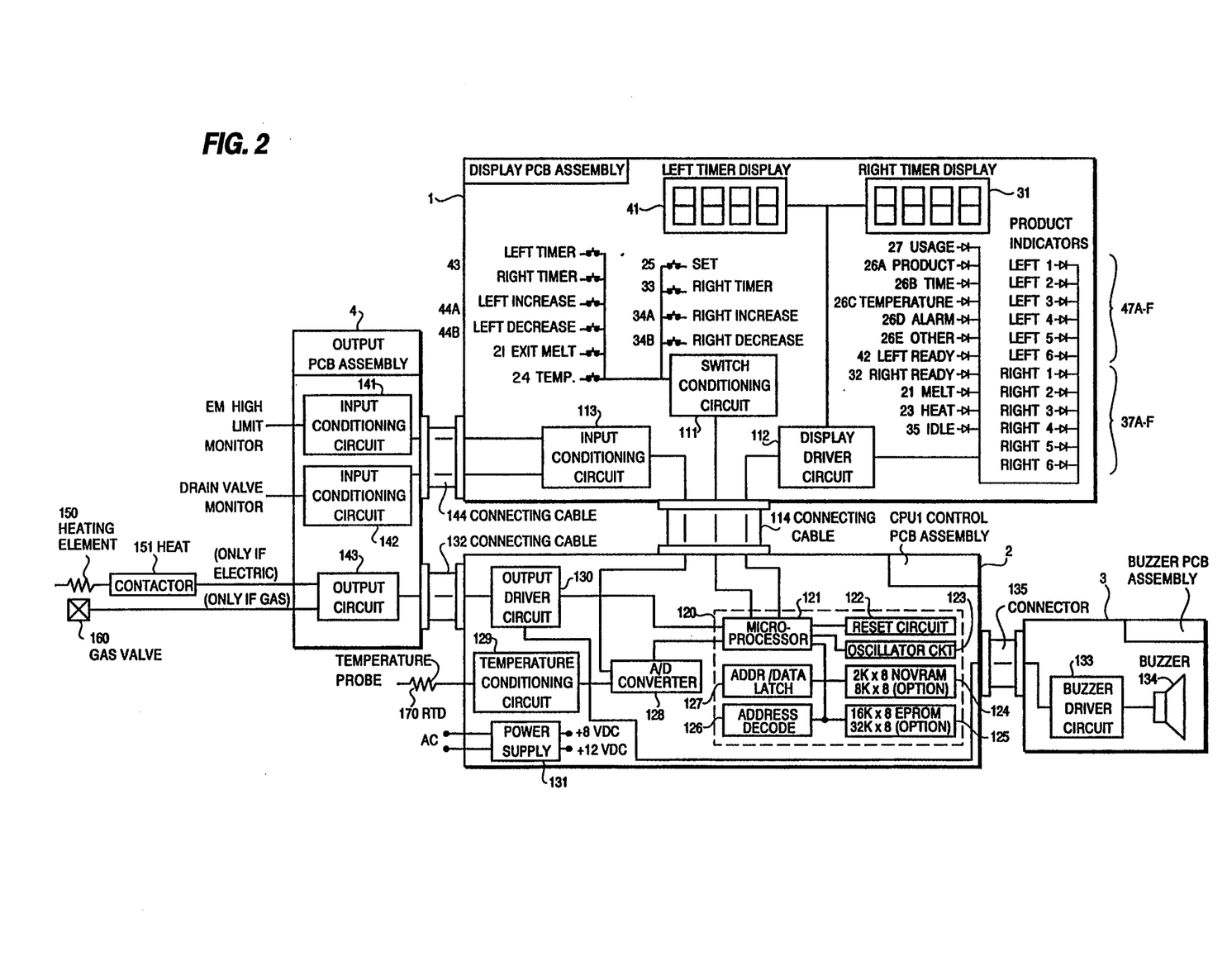
FIG. 2 is a circuit diagram for a control system including the control pad depicted in FIG. 1.

Referring to FIG. 2, a circuit diagram of an embodiment of the control system is depicted. This circuit diagram, however, is only one suitable embodiment for carrying out the present invention. The control system is powered by a power supply 131. Power supply 131 may comprise a standard power supply with an AC input and adjustable and fixed voltage regulators to provide a plurality of output voltages, for example, about five (5) and twelve (12) volts DC.

Display 1 refers generally to the display Printed Circuit Board (PCB) assembly. Display 31 and 41 are primarily time and temperature displays. Nevertheless, words and abbreviations of up to four (4) characters may be generated on displays 31 and 41, and phrases and sentences may be generated by using displays 31 and 41 together or by using either display 31 or 41 to sequentially present words. The various Light Emitting Diodes (LEDs), e.g., 37A–F and 47A–F, identified within display 1 correspond to the displays and indicators disclosed in FIG. 1. Display driver circuit 112 may comprise a MM 5450 IC driver and a resistor and capacitor to set output limiting current. Switch conditioning circuit 111 receives inputs from function switches 21, 24, 25, 33, 34A–B, 43, and 44A–B, and may comprise a plurality of pull-up resistors forming a serial shift register, such as a 74LS165 shift register.

Element 4 refers generally to an output PCB assembly. Element 4 may comprise a first input conditioning circuit 141 and a second input conditioning circuit 142. Circuit 141 is an electro-mechanical (EM) high limit monitor conditioning circuit which receives inputs from a high limit monitor. Circuit 141 may comprise two 1.5K ohm dropping resistors, one H11AA1 op-toisolator, a pull-down resistor, and a noise filter capacitor. Circuit 142 is a drain valve monitor conditioning circuit which receives input from a drain valve monitor. Circuits 141 and 142 provide input via a connecting cable 144 to input conditioning circuit 113 located in display 1. Circuit 113 conditions signals received from circuits 141 and 142 and transmits them to element 2, generally described as Central Processor Unit One (CPU1) Control PCB assembly.

Element 2 contains the CPU core, indicated by the broken-line box 120, comprising a microprocessor 121, such as a MC6803 microprocessor; an address/data latch indicator 127, such as a 74LS373N address/data latch indicator; an address decoder 126, such as a 74LS139 one-of-four address decoder; a reset circuit 122; an oscillator circuit 123; a NOVRAM 124, such as a 2K×8 (48Z02) or an 8K×8 (48Z08) NOVRAM, for storing cooking parameter data; and an EPROM 125, such as a 16K×8 (27C128) or a 32K×8 (27C256) EPROM, containing the program for the control system. Although EPROM 125 contains the program for the control system, the program is preferably generated on a large computer system, such as a microcomputer system, and is the transferred to EPROM 125. See Microfiche Appendix 1 and 2. One function of decoder 126 is to generate enable signals for NOVRAM 124 and EPROM 125.

Reset circuit 122 may comprise two resistors forming a voltage divider for the about twelve (12) or five (5) volt power supply, an amplifier (in an LM224J QUAD OP AMP package) wired as a comparator, a MOSFET (VLN 2222), a reset resistor and capacitor, and three diodes (1N914) and a resistor for switching the reset mode select voltages. Oscillator circuit 123 may comprise a 8.000 MHz crystal and two compensation capacitors. The operation of the CPU core will be readily apparent to one of ordinary skill in the art and will not be described in further detail here.

Signals from switch conditioning circuit 111 are input to microprocessor 121 via connecting cable 114. If cooking parameters are input, data stored in NOVRAM 124 is updated. If a particular food product is selected, cooking parameter data can be retrieved from NOVRAM 124. A temperature probe 170, which may comprise a 1000 ohm platinum, thin film remote temperature detector (RTD), provides an input to a temperature conditioning circuit 129. Circuit 129 may comprise a voltage divider and a capacitor for noise control. The output from circuit 129 and from circuit 113 are input to an A/D converter 128. A/D converter 128 may comprise a MC145051 converter and a by-pass capacitor. Output from A/D converter 128 also is supplied to microprocessor 121.

Signals may then be sent from microprocessor 121 to display driver circuit 112 via cable 114 to cause the appropriate displays and indicators to show the progress of the cooking program. Moreover, signals are sent from microprocessor 121 via output driver circuit 130 and connecting cable 132 to output circuit 143. Circuit 130 may comprise a UCN 5891 A IC driver and a resistor and capacitor to set output limiting current. Output circuit 143 is responsive to the operation of element 120 and may have two or more optional outputs for controlling a plurality of heating elements or types of heating elements. For example, one output may be used if an electric heating element (or elements) is used, and another output may be used if a gas heating element (or elements) is used. With an electric heating element, the output of output circuit 143 is used to control a contractor 151 which operates heating element 150. If a gas heating element is used, the output of output circuit 143 is used to control the operation of a gas valve 160. Nevertheless, the use herein of the term heating element will be understood to include gas and electric heating elements and heating elements heated by other suitable means, unless otherwise specified.

Finally, output driver circuit 130 may also provide signals to a buzzer driver circuit 133 via connector 135. Buzzer driver circuit 130 may comprise a switching transistor (2N3904), three diodes to bias the transistor, and a diode (1N914) to increase the volume of a buzzer 134. Buzzer 134 may be used to indicate an alarm or provide other signals to users.

The control system is operational in two basic modes: a run or cook mode and a control or program mode. Within each of these two basic modes, there are a plurality of operational modes in which the control system may be operated. In general, the run or cook mode is used for the actual cooking of food products. The heat control, idle, and melt modes, and cooking timer functions are active in this mode. The control or program mode is used primarily for programming of the cooking parameters including the cook, idle, and melt mode parameters and for running certain diagnostic, initializing, and calibration programs.

Figure 3:
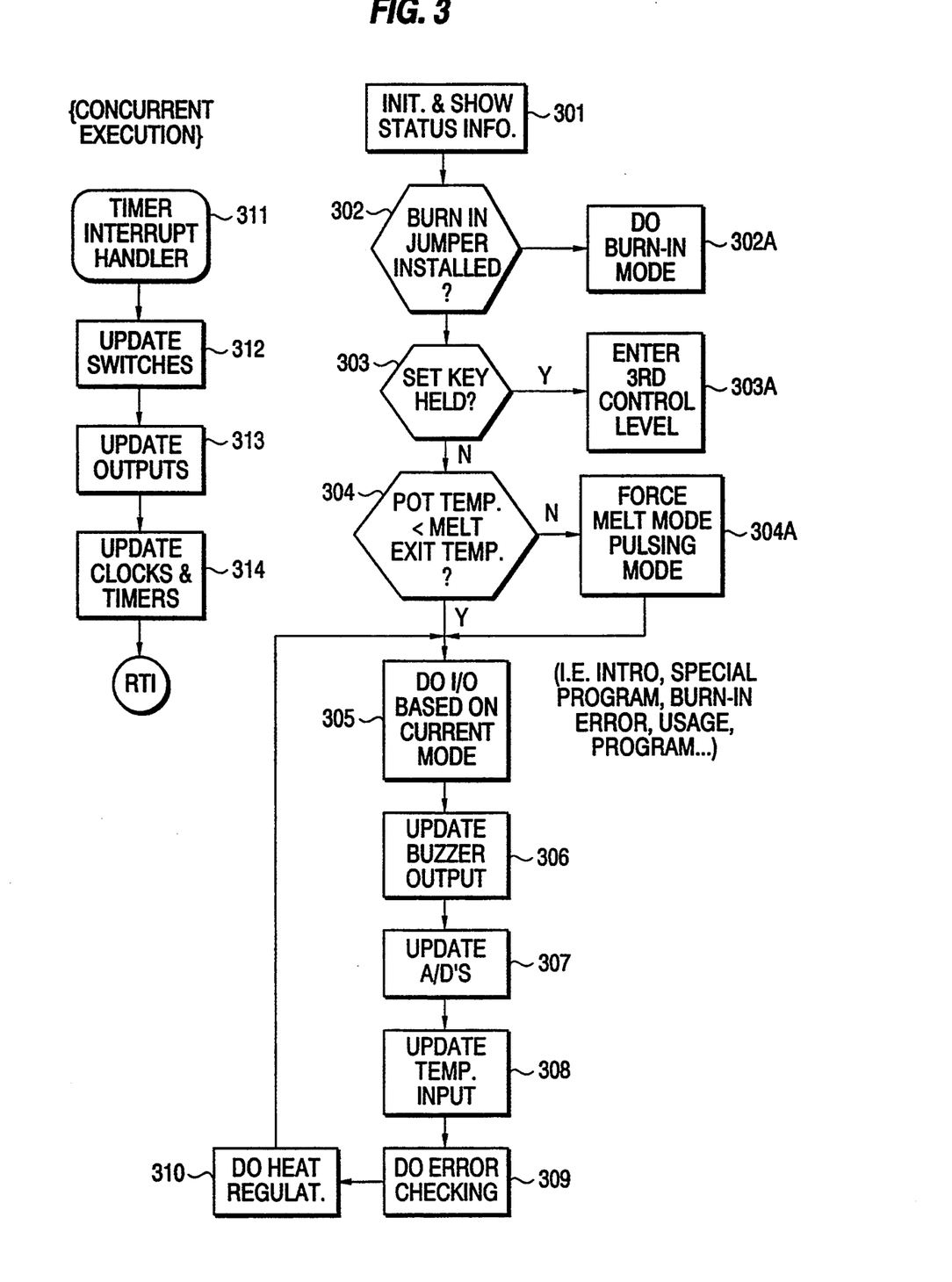
FIG. 3 is a flow chart depicting the operation of a control system for the cooking system in the run or cook mode.

The programming operation may be performed for a variety of products at at least three control levels: an operator's control level, a manager's control level, and a supervisor's or diagnostic technician's control level. See Microfiche Appendix 1. Referring to FIG. 3, the basic operation of the control system in the initialization or power-up mode and the run or cook mode are depicted. Steps 301–304 represent the initialization or power-up mode. When power switch 10 is placed in the "on" position, the control system display is initialized, and the parameters currently input to the cooking system, i.e., cooking system status, are displayed as indicated in step 301. If a burn-in jumper is installed, as indicated in step 302, the control can be run inside a high temperature control chamber to weed-out bad or faulty components. If the burn-in jumper is installed, step 302A may be performed. Nevertheless, after burn-in, the burn-in jumper must be removed, and power must be restored to the system before the system proceeds to the next step.

Figure 6:
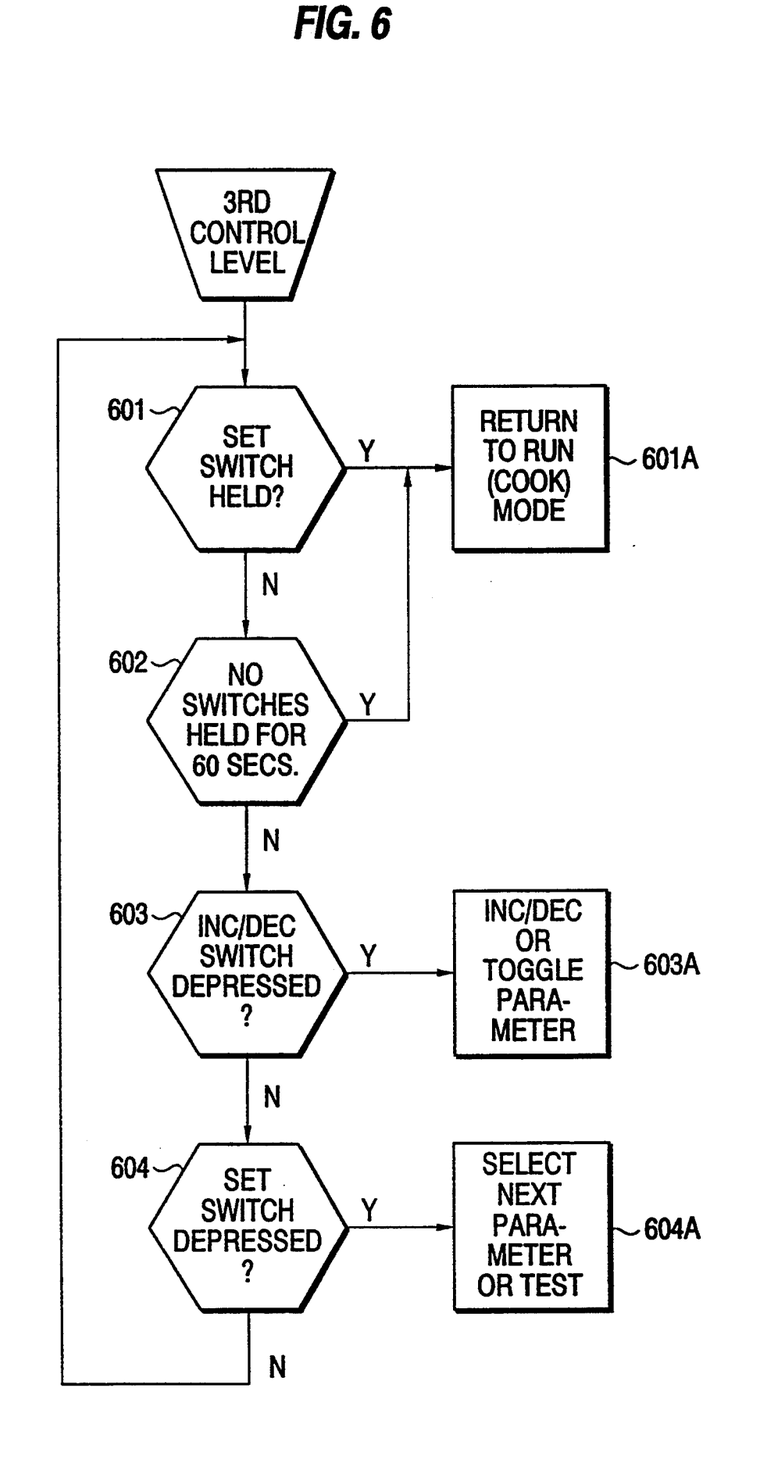
FIG. 6 is a flow chart depicting the operation of a control system for the cooking system at a third or supervisor's or diagnostic technician's control level.

Before operating or reviewing the cooking cycle, it may be desirable to enter the diagnostic technician's control level and perform some or all of the various system tests available and to choose the units of measurement that will be used to input temperature parameters. Moreover, it may be desirable to initialize the system and run an input/output test on the control system display. If the product selector (increase/decrease) switches 34A-B are simultaneously depressed after the third control level has been accessed, the control system will be initialized. If the control system is initialized, all cooking and control system parameters are cleared and replaced with the pre-programmed parameters stored within the control system. As indicated in step 303, if set switch 25 is depressed and held while the system is in the initialization or power-up mode, the user will enter the third or diagnostic technician's control level, step 303A. Referring to FIG. 6, if set switch 25 is depressed and held for a predetermined period, e.g., about one (1) second, as indicated in step 601, or no switches are depressed for a predetermined period, e.g., about sixty (60) seconds, as indicated in step 602, the control system will return to the initialization or power-up mode, step 601A.

Upon returning to the initialization or power-up mode depicted in FIG. 3, the pot or cooking vessel temperature is compared to the melt exit temperature in step 304. If the temperature is greater than or equal to the melt exit temperature, the cooking system will commence melt mode pulsing mode, as indicated in step 304A. Melt mode pulsing maintains the cooking medium at or about the pot temperature by causing the heating element to alternatively turn on and shut off at predetermined intervals.

If the pot temperature has not yet reached the exit melt temperature, the cooking system will proceed to steps 305-309, in which the various parameters, displays, and indicators may be reviewed and updated for a selected food product. In step 305, the input and output parameters are confirmed for the current cooking cycle. In step 306, buzzer output is updated. Alarms and displays are updated in step 307 to reflect cycle progress and status, and temperature inputs are updated in step 308. Finally, errors in any of the cooking parameter data are identified in step 309. Once these steps have been completed, the heating element(s) may be adjusted, as indicated in step 310, to supply more heat to the cooking medium or continue melt mode pulsing until pot temperature exceeds or equals melt exit temperature.

Concurrent with the execution of the steps 305-310, a timer interrupt handler 311 monitors the operation of the cooking system. Timer interrupt handler 311 is a means for updating all timers, internal clocks, and other timing critical functions. For example, handler 311 may generate a signal at intervals of about 1/100th of a second to update these time critical functions. In steps 312-314, the control system updates all switches, outputs, and clocks and timers, including the microprocessor's internal clock. The system may also be equipped with a timing through power loss feature which updates the number of cooking cycles completed in the event of a power loss or power outage. If a power interruption occurs, the system may determine whether a cooking timer was running at the time of power interruption. The cooking system may then simply determine whether the cooking cycle was more or less than fifty (50) percent complete at the time of interruption, or it may determine whether the temperature of the cooking medium has dropped by a predetermined number of degrees and continue the cooking cycle only if the temperature drop is less than that predetermined number.

Figure 4:
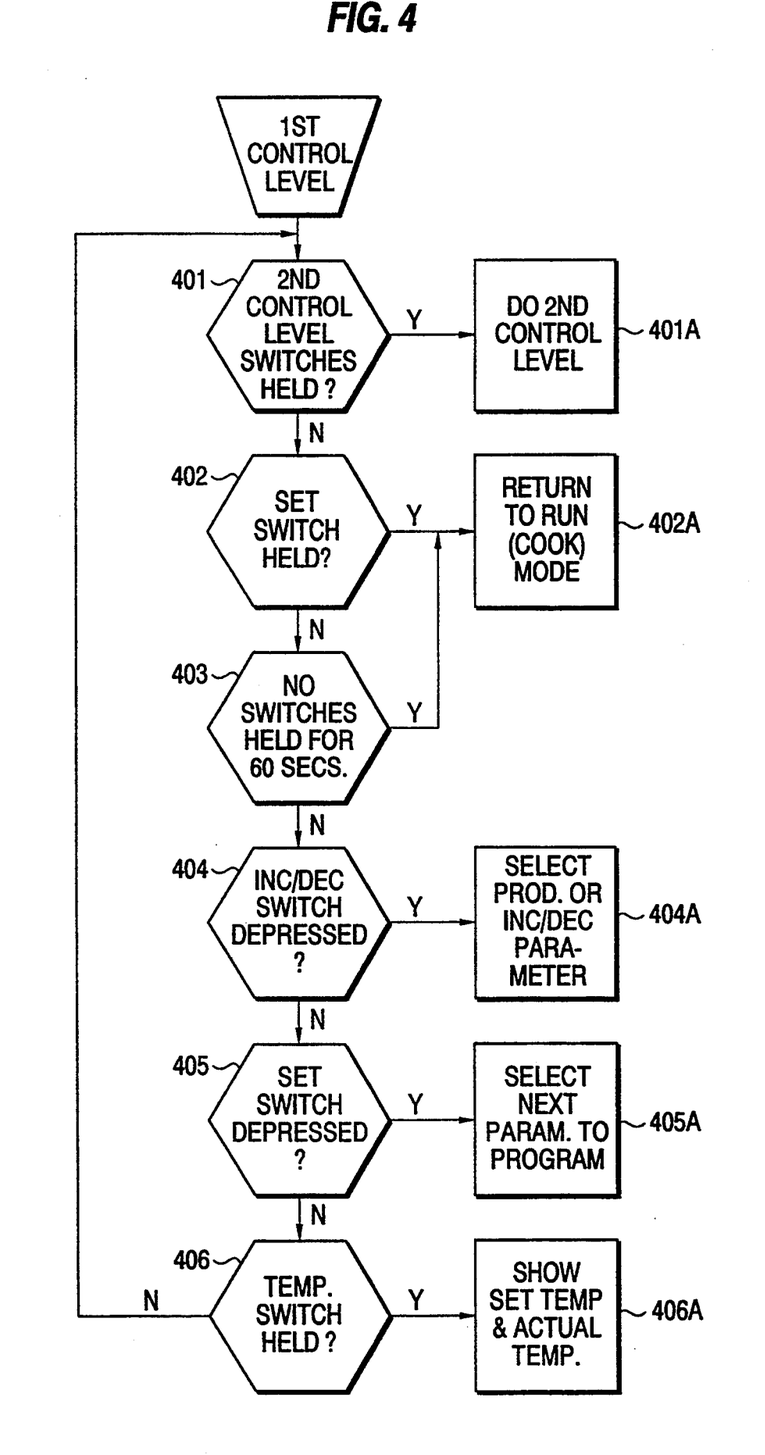
FIG. 4 is a flow chart depicting the operation of a control system for the cooking system at a first or operator's control level.

Referring to FIG. 4, the first or operator's control level can be entered from the run or cook mode by simultaneously depressing and holding temperature input switch 24 and set switch 25. From this level, the operator can enter the manager's control level by simultaneously depressing and holding set switch 25 and exit melt mode switch 21. See steps 401 and 401A. Further, if set switch 25 is depressed and held for a predetermined period, e.g., about one (1) second, as indicated in step 402, or if no switches are depressed for a predetermined period, e.g., about sixty (60) seconds, as indicated in step 402; the cooking system will return to the run or cook mode, step 402A.

By depressing product selector (increase/decrease) switches 34A-B or 44A-B in steps 404 and 404A, an operator can change the food product selected or increase or decrease a cooking parameter, e.g., cooking temperature, for a selected food product. By depressing set switch 25, as indicated in step 405, the operator may select various parameters to program for a selected product, step 405A. At this first control level, for example, the operator may enter parameters for cook time, cook temperature, hold times, and up to at least four (4) alarms for each or for all food products. Finally, if temperature switch 24 is depressed and held, as indicated in step 406, the actual temperature may be displayed on left timer display 41 and the set temperature will be displayed on right timer display 31, step 406A. Upon completion of these steps, the operator may return to step 401 and enter the second or manager's level, to step 402 and return to the run or cook mode, or to step 404 et seq. and review the cooking parameters for the food products.

Figure 5:
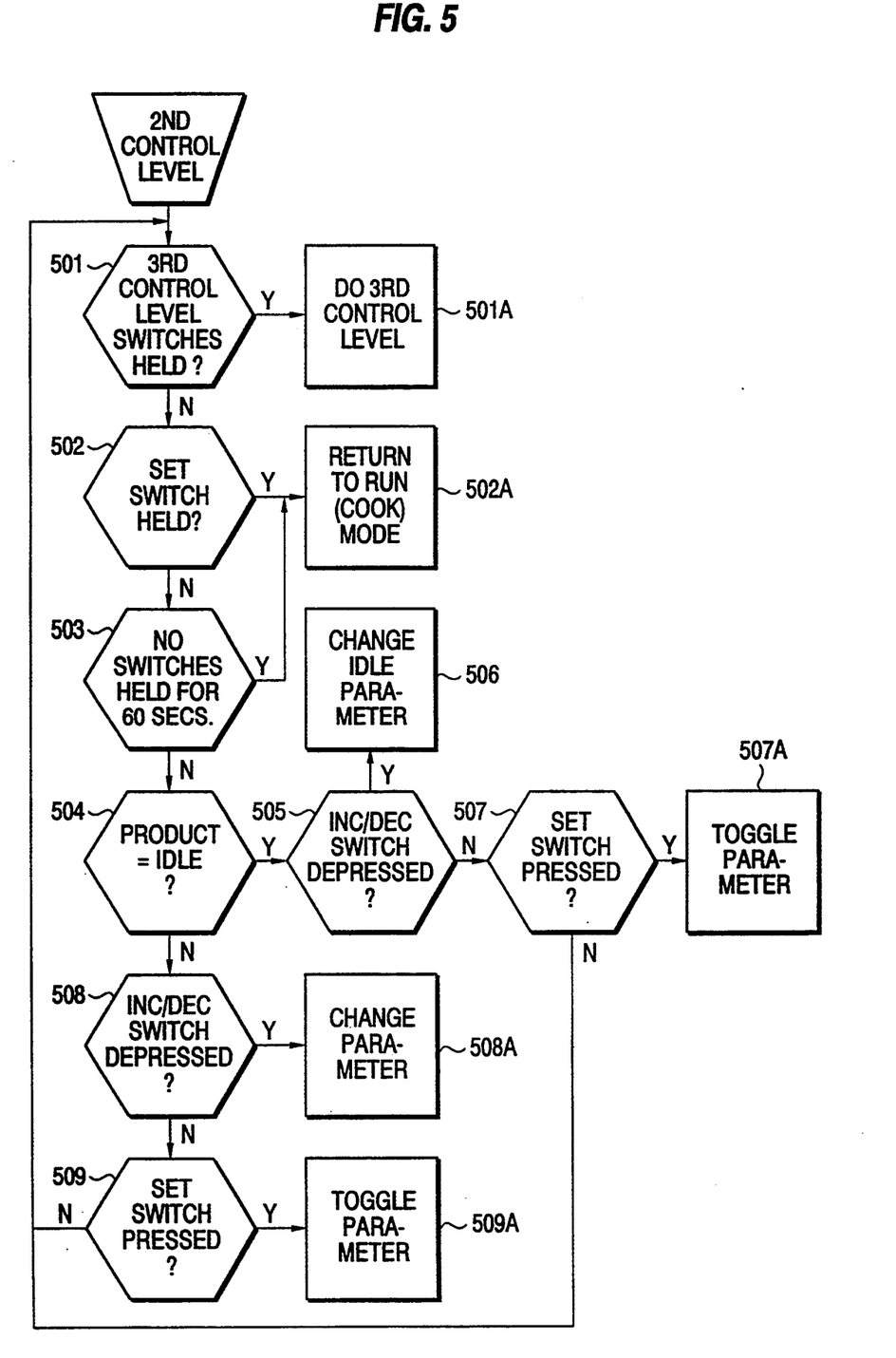
FIG. 5 is a flow chart depicting the operation of a control system for the cooking system at a second or manager's control level.

Referring to FIG. 5, the second or manager's control level may be entered by simultaneously depressing set switch 25 and exit melt mode switch 21. From this level, the manager can enter the third or supervisor's or diagnostic technician's control level by simultaneously depressing exit melt mode switch 21 and temperature input switch 24, as indicated in steps 501 and 501A. As noted with respect to the first control level, if set switch 25 is depressed and held for a predetermined period, e.g., about one (1) second, as indicated in step 502, or if no switch is depressed for a predetermined period, e.g., about sixty (60) seconds, as indicated in step 323, the cooking system will return to the run or cook mode, step 502A.

If the product selected is the idle setting indicated in step 504, i.e., idle mode indicator 35 is illuminated, the idle mode may be enabled. If idle mode has been enabled, the product selector (increase/decrease) switches 34A-B may be depressed, and the idle parameters may be changed, as indicated in step 506. While in the manager's control level, the manager also may configure the cooking system to automatically enter the idle mode after an elapsed period of time at a predetermined idle temperature, i.e., at a single temperature for all products. If, however, the product selected is not the idle setting, depressing the product selector (increase/decrease) switches 34A-B, as indicated in step 508, allows the manager to change certain parameters, e.g., load compensation and load anticipation parameter, of the product selected, step 508A.

The manager may program load compensation, proportional control, and load anticipation parameters, and the number of filter cycles permitted for each food product can also be input at this level. Regardless, whether a food product or the idle setting is first selected, food products may be selected later, and cooking parameters input. After each parameter has been changed, the manager may select a new cooking parameter (steps 507A and 509A) by depressing set switch 25, as indicated in steps 507 and 509. After completing the selection of the new parameters, the manager may again enter the third control level, as indicated in step 501, or return to the run or cook mode, as indicated in steps 502 and 503. Alternatively, the manager may review the product and idle parameters by repeating steps 504–509.

Referring to FIG. 6, the third or supervisor's or diagnostic technician's control level may be entered by simultaneously depressing exit melt mode switch 21 and temperature input switch 24. As noted above, if set switch 25 is depressed and held for a predetermined period, e.g., about one (1) second, as indicated in step 601, or if no switch is depressed for a predetermined period, e.g., about sixty (60) seconds, as indicated in step 602, the cooking system will return to the run or cook mode, step 601A. Nevertheless, if product selector (increase/decrease) switches 34A–B are depressed, as indicated in step 603, parameters may be increased or decreased or by using set switch 25, the user can step through parameters settings—step 604.

By depressing set switch 25, as indicated in step 604, the user can select the next parameter to be reviewed or changed or the next test to be performed. See Step 604A. Among the tests which may be available at the third control level are probe calibration, system initialization, and a control input/output tests. The duration of the alarms and the hold periods may also be set at this level. The user may also choose whether temperature inputs and displays are to be in degrees Fahrenheit or Celsius. Further, a global product selector may be engaged at this level which allows a single set of cooking parameters, e.g., a single cook or set temperature, to be applied to all food products.

Figure 7:
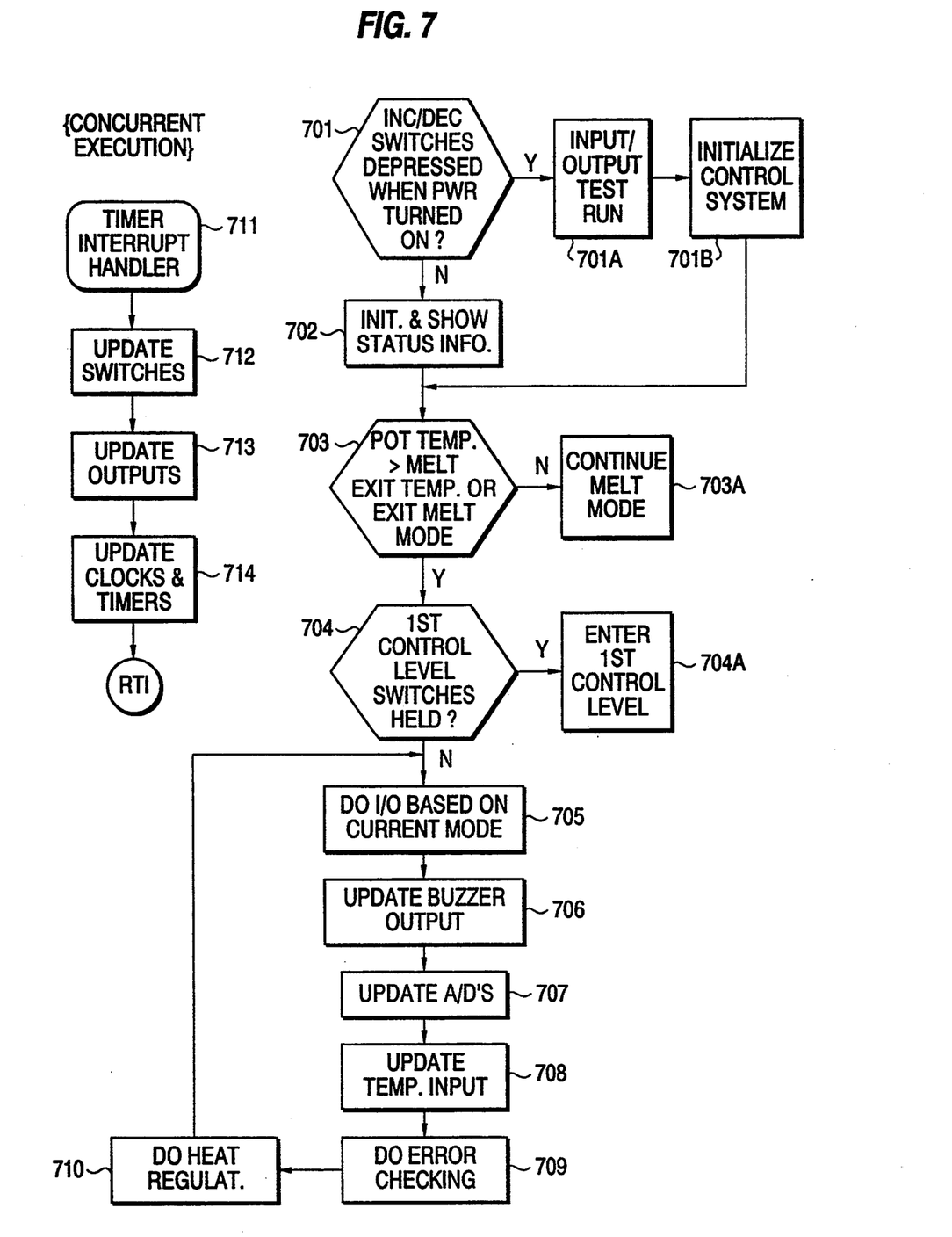
FIG. 7 is a flow chart depicting the operation of another embodiment of a control system for the cooking system in the run or cook mode.

In another embodiment of the control system, the input/output test and system initialization are available to any user turning on the control system and are not limited to users who have access to the third, or any other, control level. See Microfiche Appendix 2. Referring to FIG. 7, if product selector (increase/decrease) switches 34A–B are simultaneously depressed when power switch 10 is switched on, as indicated in step 701, the control system may enter a special programming mode. See Steps 701A–B. When in the special programming mode, the control system may be initialized by depressing and holding switch 34A or 34b for a predetermined period, e.g., about five (5) seconds. See Step 701B.

When the system is initialized, program displays 30 and 40 will flash "init" and "sys," respectively, and the preprogrammed parameters will replace any other cooking parameters which are currently stored in the system. For example, hold and alarm durations may be reset to an infinite duration. Table I provides an example of preprogrammed parameters which may be installed during system initialization.

TABLE I

| First Control Level: | |
|---|---|
| Global Temperature Setpoint: | 335° F. |

TABLE I-continued

| Fry Time: | 3:00 min. |
|---|---|
| Hold Time: | 5:00 min. |
| Alarm 1 through Alarm 4: | OFF |
| Second Control Level: | |
| Load Compensation: | 10 |
| Proportional Control: | 5 |
| Load Anticipation: | 10 |
| Filter Cycle: | OFF |
| Third Control Level: | |
| Global Temperature Enable: | ON |
| Degrees: | F |
| Probe Calibration: | (reset to 0) |
| Alarm Duration: | Infinite |
| Hold Alarm Duration: | Infinite |

In addition to system initialization, an input/output test, step 701B, may also be run in the special programming mode. This test allows each display portion and LED to be activated individually by its associated switch. Alternatively, an automatic test may be run on all of the input and output indicators.

When the special programming mode tests, such as the system initialization, are complete, the control system activates the melt mode, as it would have had the special programming mode not have been entered. If the actual temperature of the cooking medium is below the melt exit temperature, the control system may continue to heat the cooking medium. The system may automatically exit the melt mode when the cooking medium reaches a predetermined temperature, e.g., about 250° F. (118° C.). Alternatively, the melt mode may be terminated manually by depressing and holding exit melt mode switch 21 for a predetermined period, e.g., about five (5) seconds. The control system will then be in the ready mode and ready indicator 32 or 42, or both, may illuminate to indicate that the cooking system is ready to begin cooking a food product selected from right or left product menu items 36A–F or 46A–F. In certain embodiments, the control levels may only be accessed when the cooking system is in the ready mode. Further, the cook timers displayed in displays 31 and 40 may be controlled, such that they will only operate when the system is in the ready mode.

Nevertheless, if product selector (increase/decrease) switches 34A–B are not depressed when power switch 10 is switched on, as indicated in step 701, the control system will initialize and show status information governed by the cooking parameters currently input to the system. See Step 702. The remaining steps of FIG. 7, steps 705–714, correspond to steps 305–314 as discussed above and depicted in FIG. 3 and will be performed in a similar manner.

Although the number of levels; the parameters, tests, and other entries made at each level; and the switches and switch sequences used to gain access to each level have been provided in some detail, it will be apparent to those skilled in the art that various combinations of these elements are possible within the scope of the invention. It is to be understood that the scope of the invention is not to be limited by the detailed description above, but is to be determined by the claims which follow.

We claim:

1. A control system for use with a cooking system wherein said cooking system comprises a cooking vessel for holding a cooking medium and for receiving a plurality of food products, at least one heating element for heating the cooking medium, and a temperature sensor for detecting the cooking medium temperature; said control system comprising:
- a processor for receiving, storing, and selectively retrieving cooking parameters at a plurality of separately accessible control levels, for comparing said parameters to inputs from measuring devices, and for transmitting control signals to said cooking system;
- a control pad for controlling access to each of said control levels and for entering and altering said parameters at each of said control levels, having a plurality of function switches, such that when a predetermined function switch is depressed for greater than a predetermined period, said control system exits said control level and when said predetermined function switch is depressed for less than said predetermined period, cooking system information is retrieved from said processor and displayed on said control pad; and
- means responsive to said control pad and said processor for generating the cooking system information for display on said control pad and for controlling said at least one heating element.

2. The control system of claim 1 wherein each of said control levels is separately accessed by depressing a predetermined combination of said function switches.

3. The control system of claim 2 wherein said system has at least three separately accessible control levels.

4. The control system of claim 3 wherein said function switches include a first function switch, a second function switch, and a third function switch, such that a first control level is accessed by simultaneously depressing said first function switch and said second function switch, a second control level is accessed by simultaneously depressing said second function switch and said third function switch, and a third control level is accessed by simultaneously depressing said third function switch and said first function switch.

5. The control system of claim 4 wherein said second control level is only accessible from said first control level.

6. The control system of claim 5 wherein said third control level is only accessible from said second control level.

7. The control system of claim 4 wherein said third control level is only accessible from said second control level.

8. The control system of claim 4 further comprising a global product selector accessible at said third control level, such that when said global product selector is said engaged, a single cooking temperature is input at said third control level for a plurality of food products, and such that when said global product selector is disengaged, a unique cooking temperature is input for each of said plurality of food products at said first control level.

9. The control system of claim 8 further comprising a programmable alarm for indicating a plurality of timed alarms and wherein said cooking parameters which may be entered and altered at said first control level include food product cooking time, holding time, and cooking temperature, and said plurality of timed alarms.

10. The control system of claim 9 further comprising a second control level having means for selecting from said plurality of food products and an idle option at which a load compensation parameter, a proportional control parameter, a cooking medium filter cycle parameter, and a load anticipation parameter are input for each of said plurality of food products when each of said plurality of food products is selected and at which said idle mode is enabled and an idle temperature is input.

11. The control system of claim 1 wherein said system has at least three separately accessible control levels.

12. The control system of claim 11 wherein said function switches include a first function switch, a second function switch, and a third function switch and a first control level is accessed by simultaneously depressing said first function switch and said second function switch, a second control level is accessed by simultaneously depressing said second function switch and said third function switch, and a third control level is accessed by simultaneously depressing said third function switch and said first function switch.

13. The control system of claim 12 wherein said second control level is only accessible from said first control level.

14. The control system of claim 13 wherein said third control level is only accessible from said second control level.

15. The control system of claim 12 wherein said third control level is only accessible from said second control level.

16. The control system of claim 12 further comprising at said third control level diagnostic means comprising:
- a temperature units selector for selecting a unit of measure for entering and displaying the cooking medium temperature;
- temperature sensor calibration means for determining variance between an actual cooking medium temperature and the cooking medium temperature as measured by said sensor; and
- means for performing an internal test of said control pad.

17. The control system of claim 12 further comprising a usage counter for maintaining a count of completed cooking cycles for a selected food product was cooked and a cumulative count of completed cooking cycles for all food products.

18. A control system for use with a cooking system wherein said cooking system comprises a cooking vessel for holding a cooking medium and for receiving a plurality of food products, a heating element for heating the cooking medium, and a temperature sensor for sensing the temperature of said cooking medium; said control system comprising:
- a processor for receiving, storing, and selectively retrieving cooking parameters, including a cooking temperature, at a plurality of separately accessible control levels and for comparing at least the cooking temperature and the temperature of said cooking medium;
- a control pad for entering said parameters to said processor, comprising a plurality of function switches and a means for displaying a list of food products for which said parameters have been entered, wherein each of said control levels is separately accessible by depressing a predetermined pair of said switches; and
- means responsive to said control pad and said processor for displaying cooking system information on said control pad and for controlling said at least one heating element.

19. The control system of claim 18 wherein each of said control levels are separately accessed by depressing a predetermined pair of said function switches.

20. The control system of claim 19 wherein said processor has at least three separately accessible control levels.

21. The control system of claim 20 further comprising a global product selector accessible at a third control level, such that when said global product selector is engaged, a single cooking temperature is input at said third control level for said plurality of food products, and such that when said global product selector is disengaged, a unique cooking temperature is input at a first control level for each of said plurality of food products.

22. The control system of claim 21 wherein said function switches include a first function switch, a second function switch, and a third function switch and a first control level is accessed by simultaneously depressing said first function switch and said second function switch, a second control level is accessed by simultaneously depressing said second function switch and said third function switch, and a third control level is accessed by simultaneously depressing said third function switch and said first function switch.

23. The control system of claim 22 wherein said second control level is only accessible from said first control level.

24. The control system of claim 23 wherein said third control level is only accessible from said second control level.

25. The control system of claim 22 wherein said third control level is only accessible from said second control level.

26. The control system of claim 22 further comprising a global product selector accessible at said third control level, such that when said global product selector is engaged, a single cooking temperature is input at said third control level for said plurality of food products, and such that when said global product selector is disengaged, a unique cooking temperature is input at said first control level for each of said plurality of food products.

27. A control system for use with a cooking system wherein said cooking system comprises a cooking vessel for holding a cooking medium and for receiving a plurality of food products, a heating element for heating the cooking medium, and a temperature sensor for sensing the temperature of said cooking medium; said control system comprising:

a microprocessor for receiving, storing, and selectively retrieving cooking parameters, including a cooking temperature, at three separately accessible control levels and for comparing at least the cooking temperature and the temperature of said cooking medium;

a control pad for entering said parameters comprising a plurality of function switches and a means for displaying a list of food products for which said parameters may be entered, wherein each of said control levels is separately accessible by depressing a predetermined pair of said switches and wherein when a predetermined function switch is depressed for greater than a predetermined period, said control system is reset and when said predetermined function switch is depressed for less than said predetermined period, cooking system information is retrieved from said processor and displayed on said control pad; and means responsive to said control pad and said processor for generating alarms and displaying cooking system information on said control pad and for controlling said at least one heating element.

* * * * *

UNITED STATES PATENT AND TRADEMARK OFFICE
CERTIFICATE OF CORRECTION

PATENT NO. : 5,398,597
DATED : March 21, 1995
INVENTOR(S) : Richard L. Jones et al.

It is certified that error appears in the above-indentified patent and that said Letters Patent is hereby corrected as shown below:

On title page, item [73], delete "Faton" and insert --Eaton--.

Signed and Sealed this

Sixteenth Day of May, 1995

Attest:

BRUCE LEHMAN

Attesting Officer      Commissioner of Patents and Trademarks